(12) United States Patent
Shoji

(10) Patent No.: US 11,353,586 B2
(45) Date of Patent: Jun. 7, 2022

(54) LIGHT WAVE DISTANCE METER

(71) Applicant: Topcon Corporation, Tokyo (JP)

(72) Inventor: Naoki Shoji, Tokyo (JP)

(73) Assignee: Topcon Corporation, Tokyo (JP)

( * ) Notice: Subject to any disclaimer, the term of this patent is extended or adjusted under 35 U.S.C. 154(b) by 154 days.

(21) Appl. No.: 16/829,471

(22) Filed: Mar. 25, 2020

(65) Prior Publication Data

US 2020/0309951 A1 Oct. 1, 2020

(30) Foreign Application Priority Data

Mar. 26, 2019 (JP) .............................. JP2019-058443

(51) Int. Cl.
| | |
|---|---|
| *G01C 3/08* | (2006.01) |
| *G01S 17/34* | (2020.01) |
| *G01S 7/483* | (2006.01) |
| *G01S 7/32* | (2006.01) |
| *G01S 7/28* | (2006.01) |

(52) U.S. Cl.
CPC ................ *G01S 17/34* (2020.01); *G01S 7/28* (2013.01); *G01S 7/32* (2013.01); *G01S 7/483* (2013.01)

(58) Field of Classification Search
None
See application file for complete search history.

(56) References Cited

U.S. PATENT DOCUMENTS

| | | | |
|---|---|---|---|
| 5,889,490 | A | 3/1999 | Wachter et al. |
| 10,101,441 | B2 | 10/2018 | Ohtomo et al. |

| | | | | |
|---|---|---|---|---|
| 2004/0135992 | A1* | 7/2004 | Munro | ..................... G01S 17/10 356/4.01 |
| 2016/0259039 | A1 | 9/2016 | Ohtomo et al. | |
| 2020/0064186 | A1* | 2/2020 | Ta | .......................... G01S 7/4865 |

FOREIGN PATENT DOCUMENTS

| | | |
|---|---|---|
| EP | 3064962 A1 | 9/2016 |
| JP | 2016-161411 A | 9/2016 |

OTHER PUBLICATIONS

Extended European Search Report dated Aug. 19, 2020, in connection with European Patent Application No. 20165270.8, 8 pgs.

* cited by examiner

*Primary Examiner* — Mark Hellner
(74) *Attorney, Agent, or Firm* — Chiesa Shahinian & Giantomasi PC

(57) ABSTRACT

A light wave distance meter according to the present invention includes: a light-emitting element that emits a distance measurement light; a light-receiving element that outputs a light-receiving signal; a frequency conversion unit that includes a bandpass filter; an arithmetic control unit that computes a distance value to a measurement object; a signal generator that generates a signal having a predetermined frequency; a waveform conversion unit that generates a waveform conversion signal; pulse generators that generate pulse signals by pulsating the signal having a predetermined frequency so as to have a waveform profile of a signal constituted of desired frequency components on the basis of the signal output from the signal generator and the waveform conversion signal output from the waveform conversion unit; and a drive unit that emits the distance measurement light based on the pulse signals.

10 Claims, 6 Drawing Sheets

LIGHT WAVE DISTANCE METER

CROSS-REFERENCE TO RELATED APPLICATIONS

This application claims the benefit of priority from Japanese Patent Application No. 2019-058443, filed Mar. 26, 2019, the disclosure of which is disclosed herein in its entirety.

TECHNICAL FIELD

The present invention relates to a light wave distance meter.

BACKGROUND

A light wave distance meter, which emits a distance measurement light from a light-emitting element using pulse signals generated by pulsating signals having a predetermined frequency, receives reflected distance measurement light, which is the measurement light reflected by a measurement object, using a light-receiving element, and measures a distance to the measurement object based on the light-receiving signal output from the light-receiving element, is known.

For example, Japanese Patent Application Publication No. 2016-161411 discloses a light wave distance meter which causes a light-emitting element to emit light by switching intermittent modulation distance measurement signals, generated by pulsating a plurality of nearby frequencies, for each nearby frequency, and causes a light-receiving element to receive the measurement light reflected from a measurement object. The light wave distance meter disclosed in Japanese Patent Application Publication No. 2016-161411 computes the precise distance value by determining the phases of the intermittent light-receiving signals corresponding to a plurality of nearby frequencies, computes a rough measurement distance value from the phase differences of each intermittent light-receiving signal, and adds the rough measurement distance value and the precision measurement distance value, whereby the distance is measured. In the case of a light wave distance meter that measures distance to a measurement object using pulse signals (intermittent modulation distance measurement signals), such as the light wave distance meter disclosed in Japanese Patent Application Publication No. 2016-161411, improvement of the measurement accuracy, the measurable distance (reachable distance) and the scan rate is demanded.

One means of improving the measurement accuracy, the measurable distance and the scan rate is increasing intensity of distance measurement light (e.g. laser), which is emitted from the light-emitting element. In other words, output power of the light-emitting element is increased. However, intensity of the distance measurement light (e.g. laser) emitted from the light-emitting element is limited by the standards. This means that increasing the intensity of the distance measurement light in order to improve the measurement accuracy, the measurable distance and the scan rate is limited. Therefore, in a light wave distance meter which measures distance to a measurement object using pulse signals, it is demanded to improve the measurement accuracy, the measurable distance and the scan rate, while keeping the intensity of the distance measurement light (e.g. laser) within the limit specified by the standards.

SUMMARY

With the foregoing in view, it is an object of the present invention to provide a light wave distance meter which is capable of improving the measurement accuracy, the measurable distance and the scan rate.

The above problem is solved by a light wave distance meter of the present invention, that is, a light wave distance meter configured to irradiate a measurement object with a distance measurement light, and measure a distance to the measurement object based on a reflected distance measurement light, which is the distance measurement light reflected by the measurement object, including: a light-emitting element that emits the distance measurement light; a light-receiving element that receives the reflected distance measurement light and outputs a light-receiving signal in accordance with the reflected distance measurement light; a frequency conversion unit that includes a bandpass filter, which allows a specific frequency band to pass, out of the light-receiving signal output from the light-receiving element; an arithmetic control unit that executes arithmetic processing to determine a distance value to the measurement object based on the signal output from the frequency conversion unit; a signal generator that generates a signal having a predetermined frequency; a waveform conversion unit that generates a waveform conversion signal, which is constituted of desired frequency components used for the measurement of the distance; a pulse generator that generates a pulse signal by pulsating the signal having the frequency output from the signal generator, so as to have a waveform profile of a signal constituted of desired frequency components used for the measurement of the distance, based on the signal having the frequency and the waveform conversion signal output from the waveform conversion unit; and a drive unit that drives the light-emitting element and causes the light-emitting element to emit the distance measurement light based on the pulse signal generated by the pulse generator.

According to the light wave distance meter of the present invention, the pulse generator generates a pulse signal by pulsating the signal having a predetermined frequency so as to have a waveform profile of a signal constituted of desired frequency components used for the measurement of the distance, based on the signal having the frequency output from the signal generator and the waveform conversion signal output from the waveform conversion unit, which is the waveform conversion signal constituted of desired frequency components used for the measurement of the distance. Thereby the waveform profile of the pulse signal during the distance measurement (while emitting light) can match with the waveform profile of the signal constituted of desired frequency components used for the measurement of the distance. Therefore, the frequency components removed by the bandpass filter can be minimized, and energy loss caused by the bandpass filter can be reduced. Hence the signal components in the signal-noise ratio (SN ratio) can be increased, and as a result, the SN ratio can be improved. In other words, the light wave distance meter according to the present invention can use the frequency components, which are removed by the bandpass filter and are not used for measurement in a light wave distance meter of a comparative example, as desired frequency components used for the measurement of the distance. Therefore, intensity of the desired frequency components can be increased, while keeping the intensity of the distance measurement light within the limit specified by the standards. This means that the light-emitting efficiency of the light-emitting element can be improved. Thereby the measurement accuracy, the measurable distance and the scan rate can be improved, while keeping the intensity of the distance measurement light within the limit specified by the standards.

In the light wave distance meter according to the present invention, it is preferable that the signal generator generates a first modulation signal modulated by a first frequency, and a second modulation signal modulated by a second frequency which is close to the first frequency.

The pulse generator generates a first pulse modulation signal generated by pulsating the first modulation signal so as to have a waveform profile of a signal constituted of desired frequency components used for the measurement of the distance, and a second pulse modulation signal generated by pulsating the second modulation signal so as to have a waveform profile of a signal constituted of desired frequency components used for the measurement of the distance. The drive unit drives the light-emitting element based on the first pulse modulation signal and a second pulse modulation signal, and switches and emits a first distance measurement light modulated by the first frequency and the second distance measurement light modulated by the second frequency. The light-receiving element receives a first reflected distance measurement light corresponding to the first distance measurement light reflected by the measurement object, and a second reflected distance measurement light corresponding to the second distance measurement light reflected by the measurement object. The frequency conversion unit generates a first difference frequency signal by performing frequency conversion on the first reflected distance measurement light received by the light-receiving element, and generates a second difference frequency signal, which has a phase difference in accordance with the distance to the measurement object, with respect to the first difference frequency signal, by performing frequency conversion on the second reflected distance measurement light received by the light-receiving element The arithmetic control unit executes arithmetic processing to determine a distance value to the measurement object based on the first difference frequency signal and the second difference frequency signal.

According to the light wave distance meter of the present invention, the first distance measurement light modulated by the first frequency and the second distance measurement light modulated by the second frequency are switched and emitted from the light-emitting element, and the first reflected distance measurement light corresponding to the first distance measurement light reflected by the measurement object, and the second reflected distance measurement light corresponding to the second distance measurement light reflected by the measurement object are received by the light-receiving element. The first difference frequency signal generated by performing frequency conversion on the first reflected distance measurement light and the second difference frequency signal generated by performing frequency conversion on the second reflected distance measurement light have a phase difference in accordance with the distance to the measurement object, therefore the distance to the measurement object can be accurately determined based on the first difference frequency signal and the second difference frequency signal. In other words, the measurement accuracy can be further improved.

In the light wave distance meter according to the present invention, it is preferable that the waveform profile of the waveform conversion signal is a waveform profile expressed by a parabolic function.

According to the light wave distance meter of the present invention, the waveform profile of the pulse signal while emitting light can be accurately matched with the waveform profile of the signal constituted of desired frequency components used for the measurement of the distance. Therefore, the frequency components removed by the bandpass filter can be minimized with certainty, and energy loss caused by the bandpass filter can be reduced with certainty. As a result, intensity of the desired signal components can be increased with certainty, while keeping the intensity of the distance measurement light within the limit specified by the standards, and the measurement accuracy, the measurable distance and the scan rate can be improved.

In the light wave distance meter according to the present invention, it is preferable that the waveform profile of the waveform conversion signal is a waveform profile of a triangular wave.

According to the light wave distance meter of the present invention, the waveform profile of the pulse signal while emitting light can be matched with the waveform profile of the signal constituted of desired frequency components used for the measurement of the distance. Therefore, the frequency components removed by the bandpass filter can be minimized, and energy loss caused by the bandpass filter can be reduced relatively easily using a simple configuration. As a result, intensity of the desired signal components can be increased relatively easily using a simple configuration, while keeping the intensity of the distance measurement light within the limit specified by the standards, and the measurement accuracy, the measurable distance and the scan rate can be improved.

In the light wave distance meter according to the present invention, it is preferable that the waveform profile of the waveform conversion signal is a waveform profile of a sawtooth wave.

According to the light wave distance meter of the present invention, the waveform profile of the pulse signal while emitting light can be matched with the waveform profile of the signal constituted of desired frequency components used for the measurement of the distance relatively easily using a simple configuration. Therefore, the frequency components removed by the bandpass filter can be minimized, and energy loss caused by the bandpass filter can be reduced relatively easily using a simple configuration. As a result, intensity of the desired signal components can be increased relatively easily using a simple configuration, while keeping the intensity of the distance measurement light within the limit specified by the standards, and the measurement accuracy, the measurable distance and the scan rate can be improved.

In the light wave distance meter according to the present invention, it is preferable that the waveform profile of the waveform conversion signal is a waveform profile expressed by a Gaussian function.

According to the light wave distance meter according to the present invention, the waveform profile of the pulse signal while emitting light can be more accurately matched with the waveform profile of the signal constituted of desired frequency components used for the measurement of the distance. Therefore, the frequency components removed by the bandpass filter can be minimized with even higher certainty, and energy loss caused by the bandpass filter can be reduced with even higher certainty. As a result, intensity of the desired frequency components can be increased with even higher certainty, while keeping the intensity of the distance measurement light within the limit specified by the standards, and the measurement accuracy, the measurable distance and the scan rate can be improved.

According to the present invention, a light wave distance meter that is capable of improving the measurement accuracy, the measurable distance and the scan rate can be provided.

DETAILED DESCRIPTION

An embodiment of the present invention will be described in detail with reference to the drawings.

The embodiment described below is a preferred example of the present invention, and is restricted by various technical preferences, but the scope of the present invention is not limited to these modes unless otherwise indicated in the following description. In each drawing, the same composing element is denoted with a same reference sign, and redundant detailed description thereof may be omitted.

Figure 1:
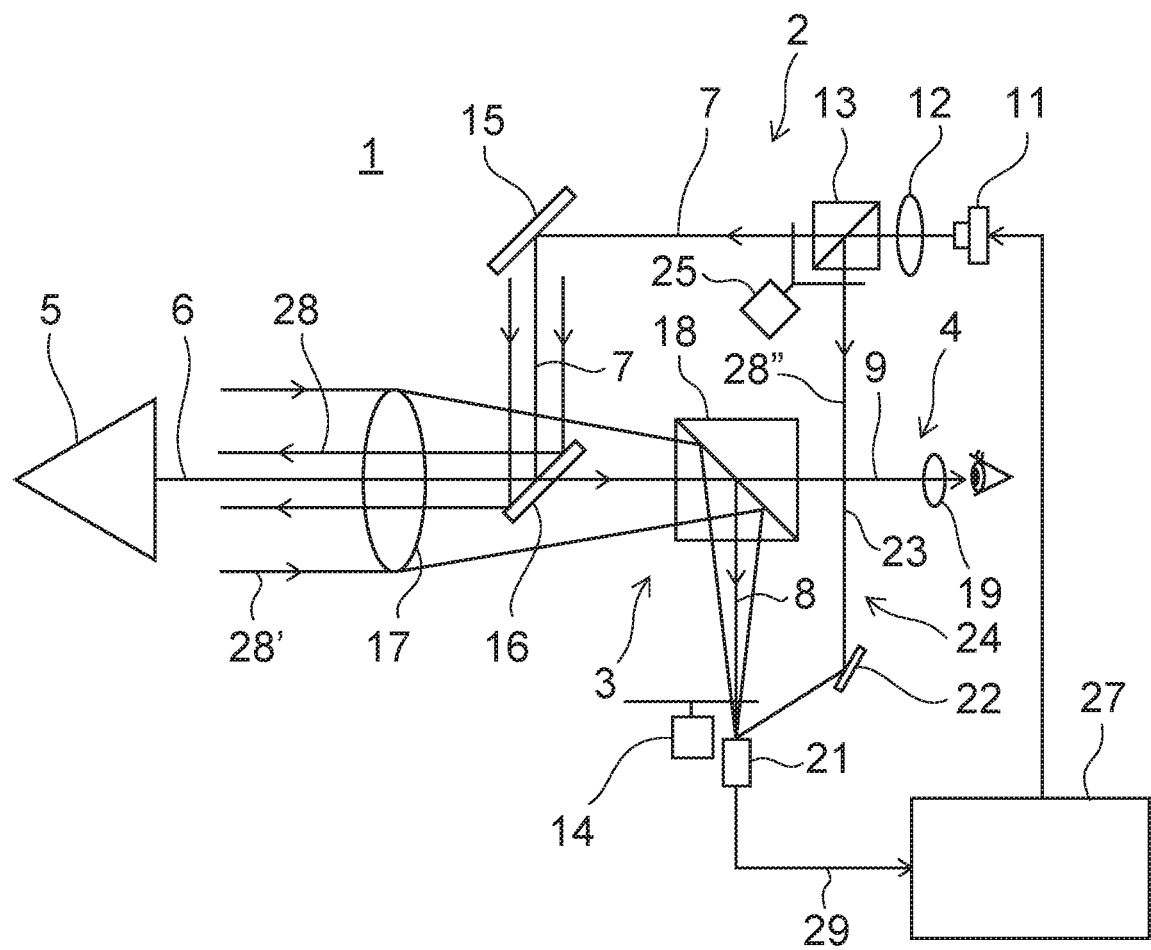
FIG. 1 is a schematic diagram depicting a distance measurement optical system of the light wave distance meter according to an embodiment of the present invention.

FIG. 1 is a schematic diagram depicting a distance measurement optical system of a light wave distance meter according to an embodiment of the present invention.

As illustrated in FIG. 1, the distance measurement optical system 1 includes a light-emitting optical system 2, a light-receiving optical system 3, and a collimation optical system 4. In FIG. 1, a measurement object 5 indicates a prism, which is a recursive reflector.

The distance measurement optical system 1 has a distance measurement optical axis 6 directed to the measurement object 5. The light-emitting optical system 2 has a light-emitting optical axis 7. The light-receiving optical system 3 has a light-receiving optical axis 8. The collimation optical system 4 has a collimation optical axis 9.

On the light-emitting optical axis 7, a light-emitting element 11, a condensing lens 12, a half mirror 13 and deflecting mirrors 15 and 16 are disposed. A distance measurement light that passes through the light-emitting optical axis 7 is deflected by the deflecting mirrors 15 and 16, and is aligned with the distance measurement optical axis 6. The light-emitting element 11 is a laser diode, for example, and emits a distance measurement light which is invisible light. The distance measurement light, however, is not limited to invisible light, and may be visible light.

An objective lens 17 and a dichroic mirror 18 are disposed on the distance measurement optical axis 6. The dichroic mirror 18 allows the visible light to transmit through, and reflects the distance measurement light. The portion of the distance measurement optical axis 6, which transmits through the dichroic mirror 18, becomes the collimation optical axis 9. An eyepiece 19 is disposed on the collimation optical axis 9.

The objective lens 17, the dichroic mirror 18 and the eyepiece 19 constitute the collimation optical system 4.

The condensing lens 12, the half mirror 13, the deflecting mirrors 15 and 16 and the objective lens 17 constitute the light-emitting optical system 2.

The portion of the distance measurement optical axis 6, reflected by the dichroic mirror 18, becomes the light-receiving optical axis 8. A light quantity adjustor 14 and a light-receiving element 21 are disposed on the light-receiving optical axis 8. For the light-receiving element 21, a photodiode or an avalanche photodiode (APD), for example, is used. The objective lens 17, the dichroic mirror 18 and the light quantity adjustor 14 constitute the light-receiving optical system 3.

The reflection optical axis of the half mirror 13 is guided to the light-receiving element 21 as an internal reference optical axis 23 via a reflection mirror 22. The half mirror 13 and the reflection mirror 22 constitute an internal reference optical system 24. Each of the light-emitting element 11 and the light-receiving element 21 is electrically connected to the arithmetic processing unit 27.

An optical path switching unit 25 is disposed on the light-emitting optical path 7 and the internal reference optical axis 23. The optical path switching unit 25 alternatively closes or opens the light-emitting optical path 7 and the internal reference optical axis 23. The optical path switching unit 25 switches between: a state where the distance measurement light, transmitted through the half mirror 13, is emitted toward the measurement object 5; and a state where a part of the distance measurement light, reflected by the half mirror 13, is emitted toward the internal reference optical system 24.

The function of the distance measurement optical system 1 will be described next.

A distance measurement light 28, which is emitted from the light-emitting element 11 and collimated into the parallel luminous flux by the condensing lens 12, transmits through a center portion of the objective lens 17, and is emitted to the measurement object 5.

The distance measurement light reflected by the measurement object 5 enters the objective lens 17 as a reflected distance measurement light 28', is condensed by the objective lens 17, is reflected by the dichroic mirror 18, is adjusted by the light quantity adjustor 14, and then enters the light-receiving element 21. The light-receiving element 21 outputs an intermittent light-receiving signal 29 in accordance with the received reflected distance measurement light 28'.

A part of the distance measurement light 28 (internal reference light 28") emitted from the light-emitting element 11 is reflected by the half mirror 13. The optical path is switched by the optical path switching unit 25, whereby the internal reference optical axis 23 is opened, and the internal reference light 28" enters the light-receiving element 21 via the internal reference optical system 24. The light-receiving element 21 outputs a light-receiving signal in accordance with the received internal reference light 28". The processing of the light-receiving signal when the light-receiving element 21 receives the reflected distance measurement light 28' is the same as the processing of the light-receiving signal when the light-receiving element 21 receives the internal reference light 28". Therefore, in this embodiment, the processing of the light-receiving signal of the reflected distance measurement light 28' will be described as an example.

The visible light that enters through the objective lens 17 transmits through the dichroic mirror 18, and is condensed by the eyepiece 19. The observer can collimate the measurement object 5 by the visible light that enters through the eyepiece 19.

The arithmetic processing unit 27 of the light wave distance meter according to this embodiment will be described next.

Figure 2:
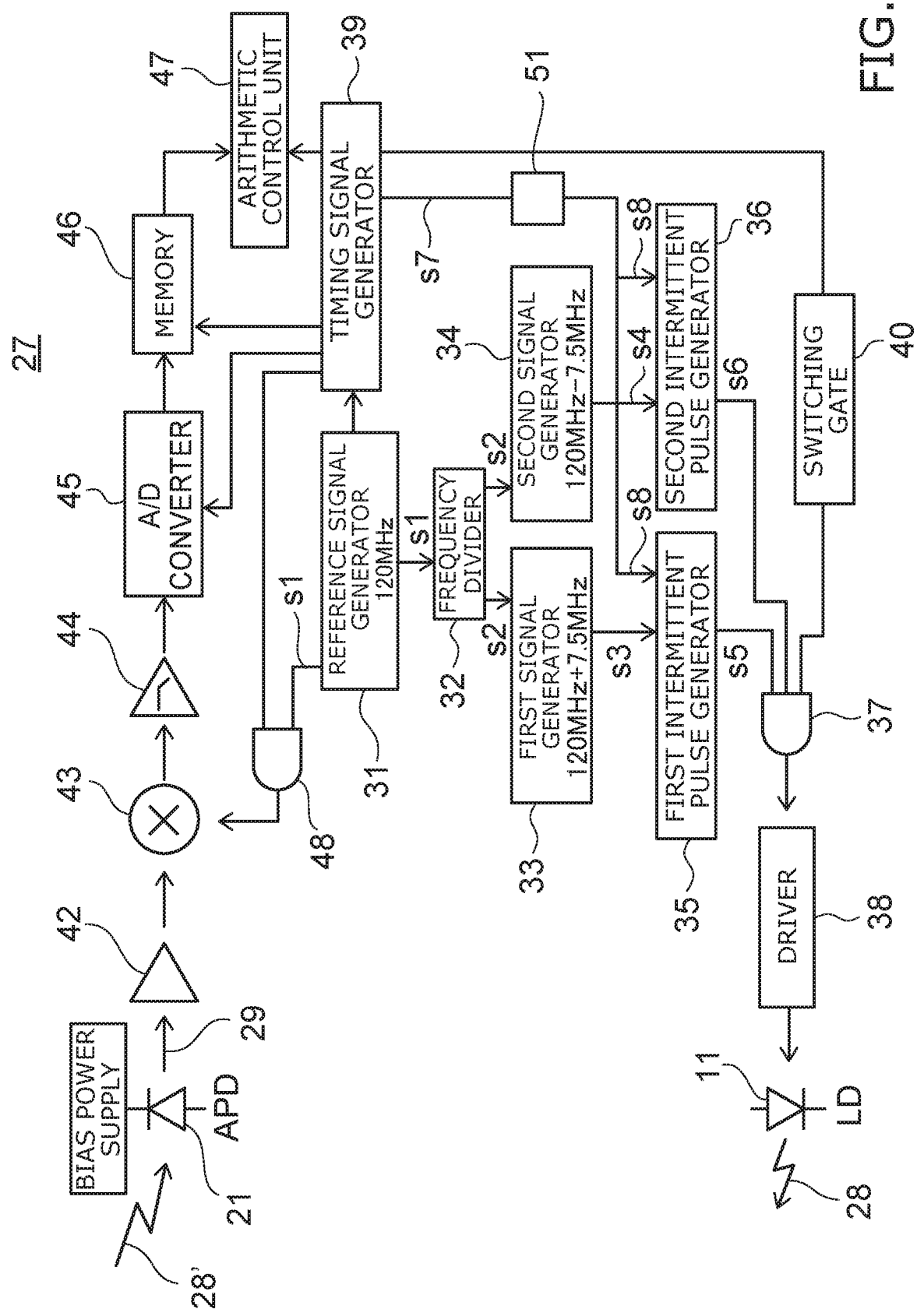
FIG. 2 is a diagram depicting an arithmetic processing unit of the light wave distance meter according to this embodiment.

FIG. 2 is a schematic diagram depicting the arithmetic processing unit of the light wave distance meter according to this embodiment.

A reference signal generator 31 generates and outputs a reference frequency signal s1 having a predetermined reference frequency fc. The numeric values indicated herein below may be changed in accordance with the measurement distance and the measurement accuracy. For example, in the following description, the reference frequency fc is assumed to be 120 MHz.

The reference signal generator 31 generates and outputs the reference frequency signal s1 having the reference frequency fc. The reference signal generator 31 of this embodiment is an example of the "signal generator" of the present invention. The reference frequency fc of the reference frequency signal s1 output from the reference signal generator 31 is divided into 1/n frequency using a frequency divider 32. Thereby a divided frequency signal s2 having the frequency f is generated. The divided frequency signal s2 is inputted to a first signal generator 33 and a second signal generator 34. The frequency f of the divided frequency signal s2 is fc/n, and if the frequency divider 32 is a frequency divider that divides the reference frequency fc by 120 MHz into 1/16 frequency, the frequency f of the divided frequency signal s2 becomes 7.5 MHz.

The first signal generator 33 generates a first modulation signal s3 modulated by fc+f [Hz] based on the divided frequency signal s2 and the reference frequency signal s1, and outputs the first modulation signal s3 to a first intermittent pulse generator 35. The second signal generator 34 generates a second modulation signal s4 modulated by fc−f [Hz] based on the divided frequency signal s2 and the reference frequency signal s1, and outputs the second modulation signal s4 to a second intermittent pulse generator 36. By the first signal generator 33 and the second signal generator 34, two modulation signals (fc+f [Hz] and fc−f [Hz]) having close frequencies are generated.

The first intermittent pulse generator 35 pulsates the first modulation signal s3, which is a continuous signal, and converts the first modulation signal s3 into a first pulse modulation signal s5, which is an intermittent signal emitted at predetermined intervals. In other words, the first intermittent pulse generator 35 pulsates the first modulation signal s3, which is a continuous signal, and generates the first pulse modulation signal s5, which is an intermittent signal.

In this description, it is assumed that a "pulsed signal" or a "pulse signal" includes not only an intermittent signal of a rectangular wave, but also includes an intermittent signal having a waveform profile expressed by a parabolic function, an intermittent signal of a triangular wave, an intermittent signal of a sawtooth wave, an intermittent signal of a sinusoidal wave, and an intermittent signal having a waveform profile expressed by a Gaussian function.

The first intermittent pulse generator 35 of this embodiment is an example of the "pulse generator" of the present invention. The first intermittent pulse generator 35 outputs the first pulse modulation signal s5 to an AND circuit 37. This means that the pulse of the first pulse modulation signal s5 includes the frequency of fc+f (120 MHz+7.5 MHz). The first pulse modulation signal s5 will be described in detail later.

The second intermittent pulse generator 36 pulsates the second modulation signal s4, which is a continuous signal, and converts the second modulation signal s4 into a second pulse modulation signal s6, which is an intermittent signal emitted at predetermined intervals. In other words, the second intermittent pulse generator 36 pulsates the second modulation signal s4, which is a continuous signal, and generates the second pulse modulation signal s6, which is an intermittent signal. The second intermittent pulse generator 36 of this embodiment is an example of the "pulse generator" of the present invention. The second intermittent pulse generator 36 outputs the second pulse modulation signal s6 to the AND circuit 37. This means that the pulse of the second pulse modulation signal s6 includes the frequency of fc−f (120 MHz−7.5 MHz). The second pulse modulation signal s6 will be described in detail later.

A timing signal generator 39 generates a timing signal s7 which is based on the reference frequency signal s1 generated by the reference signal generator 31, and which switches between the light-emitting state and the non-light-emitting state of the first pulse modulation signal s5 and the second pulse modulation signal s6 respectively. The timing signal generator 39 outputs a timing signal s7 to a waveform conversion unit 51, and controls so that the first pulse modulation signal s5 from the first intermittent pulse generator 35 and the second pulse modulation signal s6 from the second intermittent pulse generator 36 are output alternately at predetermined intervals (burst time cycle) tb (see FIG. 3).

The waveform conversion unit 51 converts the waveform profile of the timing signal s7 output from the timing signal generator 39, and generates a waveform conversion signal s8 constituted of desired frequency components used for measurement of the distance. The waveform conversion unit 51 is, for example, an operational amplifier, an analog filter, a digital analog convertor (DAC) or the like. The function of the waveform conversion unit 51 will be described in detail later. The waveform conversion signal s8, of which the wave form profile of the timing signal s7 has been converted by the waveform conversion unit 51, is inputted to the first intermittent pulse generator 35 and the second intermittent pulse generator 36. In other words, the timing signal s7, which is output from the timing signal generator 39 to the first intermittent pulse generator 35 and the second intermittent pulse generator 36, is inputted to the first intermittent pulse generator 35 and the second intermittent pulse generator 36 as the waveform conversion signal s8, of which waveform profile has been converted by the waveform conversion unit 51.

Further, the timing signal output from the timing signal generator 39 is inputted to a switching gate 40. The switching gate 40 outputs a switching signal to the AND circuit 37. The AND circuit 37 outputs the first pulse modulation signal s5 and the second pulse modulation signal s6 alternately to the driver 38, corresponding to the switching signal output from the switching gate 40.

A driver 38 drives the light-emitting element 11 based on the first pulse modulation signal s5 and the second pulse modulation signal s6, so that the distance measurement light (first distance measurement light) modulated by fc+f (120 MHz+7.5 MHz) and the distance measurement light (second distance measurement light) modulated with fc−f (120

Figure 3:
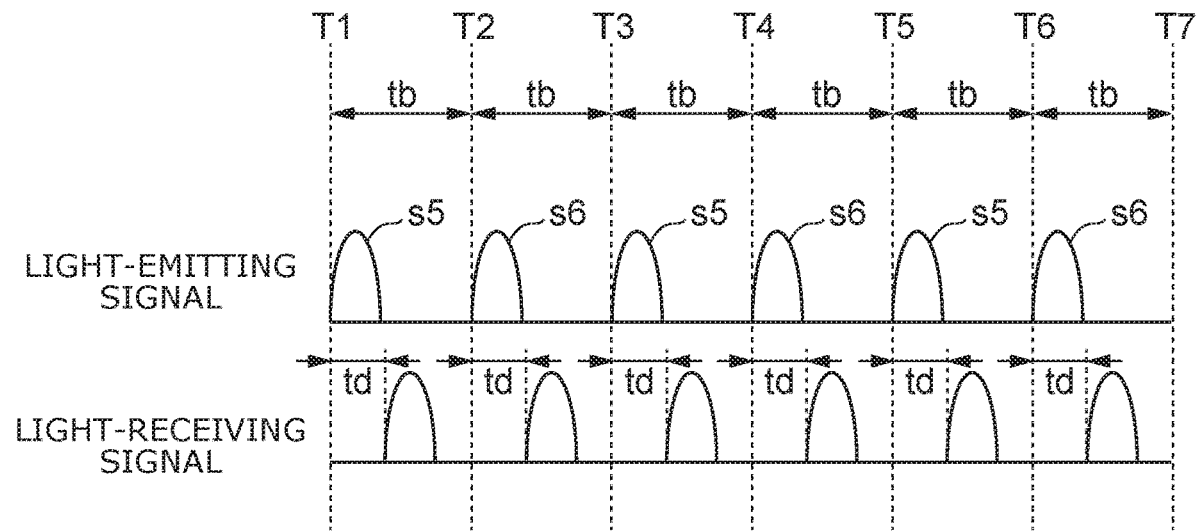
FIG. 3 is a timing chart indicating a light-emitting signal and a light-receiving signal of the light wave distance meter according to this embodiment.

MHz−7.5 MHz) are switched and emitted by predetermined intervals tb (see FIG. 3). The driver 38 of this embodiment is an example of the "drive unit" of the present invention.

The distance measurement light 28 which was reflected by the measurement object 5 and passed through the light-receiving optical system 3 (that is, the reflected distance measurement light 28') enters the light-receiving element 21. The light-receiving signal output from the light-receiving element 21 is amplified by an amplifier 42. The signal amplified by the amplifier 42 is inputted to a mixing circuit 43. The reference frequency signal s1 having the reference frequency fc (120 MHz) is inputted to the mixing circuit 43 from the reference signal generator 31 via the AND circuit 48. The timing, at which the reference frequency signal s1 is inputted to the mixing circuit 43, is controlled by a timing signal which is output from the timing signal generator 39. Thereby in the mixing circuit 43, the reference frequency signal s1 is mixed with the light-receiving signal (intermittent signal) of the pulse modulation light having fc+f (120 MHz+7.5 MHz) and the light-receiving signal (intermittent signal) of the pulse modulation light having fc−f (120 MHz−7.5 MHz) respectively.

The light-receiving signal of the pulse modulation light having 120 MHz+7.5 MHz and the light-receiving signal of the pulse modulation light having 120 MHz−7.5 MHz are frequency-converted by the mixing with the reference frequency signal s1. Then the frequency having ±7.5 MHz, which is determined by subtracting the reference frequency fc (−120 MHz+120 MHz+7.5 MHz, −120 MHz+120 MHz−7.5 MHz), and the frequency of 240 MHz±7.5 MHz determined by adding the reference frequency fc (120 MHz+120 MHz+7.5 MHz, 120 MHz+120 MHz−7.5 MHz), are acquired. The signals output from the mixing circuit 43 pass through a low pass filter 44 where the high frequency components are removed. In other words, the low pass filter 44 removes the high frequency bands (high frequency components) and allows specific frequency bands to pass. The low pass filter 44 of this embodiment is an example of the "bandpass filter" of the present invention. As a result, a difference frequency of ±7.5 MHz remains, and the band that can pass the low pass filter 44 is set to about 10 MHz, which is sufficient to acquire the difference frequency of 7.5 MHz.

The mixing circuit 43 and the low pass filter 44 frequency-converts the pulse modulation light having 120 MHz+7.5 MHz received by the light-receiving element 21, and generates a difference frequency signal (first difference frequency signal) having +7.5 MHz, and also frequency-converts the pulse modulation light having 120 MHz-7.5 MHz received by the light-receiving element 21, and generates a difference frequency signal (second difference frequency signal) having −7.5 MHz. The difference frequency signal having −7.5 MHz is a signal having a phase difference in accordance with the distance to the measurement object 5, with respect to the difference frequency signal having +7.5 MHz.

In the two difference frequency signals, one is a difference frequency signal having 7.5 MHz of which phase progresses in time, and the other is a difference frequency signal having 7.5 MHz of which phase regresses in time. There is a phase shift (phase difference) corresponding to the distance (time) between these difference frequency signals. The reference signal generator 31, the timing signal generator 39, the AND circuit 48, the mixing circuit 43, the low pass filter 44 and the like function as the "frequency conversion unit" of the present invention.

An AD convertor 45 converts the difference frequency signal, which is an analog signal output from the low pass filter 44, into a digital signal, and stores the digital signal in a memory 46 (storage unit) as the sampling data.

An arithmetic control unit 47 executes various types of arithmetic processing based on the sampling data stored in the memory 46. In concrete terms, the arithmetic control unit 47 executes arithmetic processing to determine a distance value d3 from the light wave distance meter to the measurement object 5, based on the sampling data stored in the memory 46.

In other words, the arithmetic control unit 47 computes the difference frequency signal having 7.5 MHz and the difference frequency signal having −7.5 MHz from the sampling data stored in the memory 46, and computes a roughly measured distance value d1 (first distance value) from the phase difference between the two difference frequency signals. The phase difference of the two difference frequency signals is equivalent to a value measured in the measurement based on the difference of the intermittent modulation frequency (15 MHz). Assuming that each phase of the two difference frequency signals is taken as ϕ1 and ϕ2, then the roughly measured distance d1 (m) that is determined is expressed by the following expression (1), since the wavelength of the frequency difference 15 MHz is 10 m.

$$d1 = 10 \times (\phi 1 - \phi 2)/2\pi \quad (1)$$

The arithmetic control unit 47 computes the difference frequency signal having 7.5 MHz and the difference frequency signal having −7.5 MHz from the sampling data stored in the memory 46, then determines the respective phases of these difference frequency signals, and computes the precisely measured distance value d2 (second distance value) corresponding to these difference frequency signals from the phases and the velocity of light. Further, the arithmetic control unit 47 executes arithmetic processing to determine the distance value d3 (third distance value) from the light wave distance meter to the measurement object 5 by adding the precisely measured distance value d2 to the roughly measured distance value d1.

In order to compute the roughly measured distance value d1, the arithmetic control unit 47 subtracts the roughly measured distance value, which was computed from the light-receiving signal of the internal reference light 28", from the roughly measured distance value, which was computed from the light-receiving signal of the reflected distance measurement light 28'. In the same manner, in order to compute the precisely measured distance value d2, the arithmetic control unit 47 subtracts the precisely measured distance value, which was computed from the light-receiving signal of the internal reference light 28", from the precisely measured distance value, which was captured from the light-receiving signal of the reflected distance measurement light 28'.

The arithmetic control unit 47 can remove the influence of the temperature drifting and the like of the arithmetic processing unit 27, which is an electric circuit, by determining the difference between the measured distance value computed from the reflected distance measurement light 28' and the measured distance value computed from the internal reference light 28". The roughly measured distance value and the precisely measured distance value computed from the light-receiving signal of the internal reference light 28" may be computed and stored in the memory 46 in advance.

In the case of the light wave distance meter which measures the distance to a measurement object using pulse signals, as in the case of the light wave distance meter of this embodiment, it is demanded to improve the measurement accuracy, the measurable distance (reachable distance) and the scan rate while keeping the intensity of the distance measurement light (e.g. laser) within the limit specified by the standards. According to the knowledge acquired by the present inventors, the periodic error increases if the signal-noise ratio (SN ratio) is increased to improve the measurement accuracy, the measurable distance and the scan rate. In other words, the SN ratio and the periodic error are in a tradeoff relationship. An increase in the SN ratio increases the periodic error because the waveform profile of the signal is distorted. In other words, according to the knowledge acquired by the present inventors, the waveform profile of a signal is distorted when the light-receiving signal in accordance with the reflected distance measurement light is output from the light-receiving element and passes through the bandpass filter. That is, the waveform profile of the distance measurement signal (pulse signal that is inputted to the driver) during the distance measurement (driving emitted light) is distorted when the light-receiving signal passes through the bandpass filter when receiving light. This means that the waveform profile of the light-receiving signal which passed the bandpass filter when receiving light is different from the waveform profile of the pulse signal when emitting light.

Further, according to the knowledge acquired by the present inventors, in the light wave distance meter that measures distance to a measurement object using pulse signals, the pulse signal when emitting light and the light-receiving signal include not only signals having the desired frequency used for measuring the distance, but also signals having frequencies in a band that deviated from the desired frequency. The frequency components that deviated from the desired frequency are removed when the light-receiving signal passes through the bandpass filter when receiving light. In other words, from the light-receiving signal, the bandpass filter extracts only the desired frequency components that are used for measurement of the distance. This means that energy is consumed when the light-emitting element emits light, even for frequency components which are removed by the band pass filter and are not used for the measurement of the distance.

In the case of the light wave distance meter according to this embodiment, on the other hand, the waveform conversion unit 51 converts the waveform profile of the timing signal s7 which is output from the timing signal generator 39, and generates the waveform conversion signal s8 constituted of desired frequency components used for the measurement of the distance. Then based on the first modulation signal s3 output from the first signal generator 33 and the waveform conversion signal s8 which is generated and output by the waveform conversion unit 51, the first intermittent pulse generator 35 generates the first pulse modulation signal s5 by pulsating the first modulation signal s3 so as to have the waveform profile of the signal constituted of desired frequency components used for the measurement of the distance. Further, based on the second modulation signal s4 output from the second signal generator 34 and the waveform conversion signal s8 which is generated by and output from by the waveform conversion unit 51, the second intermittent pulse generator 36 generates the second pulse modulation signal s6 by pulsating the second modulation signal s4 so as to have the waveform profile of the signal constituted of desired frequency components used for the measurement of the distance.

According to the light wave distance meter of this embodiment, the waveform profile of the pulse signal (first pulse modulation signal s5 and second pulse modulation signal s6), which is inputted to the driver 38 during distance measurement (when emitting light) matches with the waveform profile of the signal constituted of desired frequency components used for the measurement of the distance. Therefore, the frequency components removed by the low pass filter 44 can be minimized, and energy loss caused by the low pass filter 44 can be reduced. This means that the signal components in the signal-noise ratio (SN ratio) can be increased, which improves the SN ratio. As a result, the intensity of the desired frequency components (difference frequency signal having ±7.5 MHz used for the measurement of the distance in the case of this embodiment) can be increased, while keeping the intensity of the distance measurement light 28 within the limit specified by the standards. In other words, the light-emitting efficiency of the light-emitting element 11 can be improved. Thereby the measurement accuracy, the measurable distance and the scan rate can be improved while keeping the intensity of the distance measurement light 28 within the limit specified by the standards.

The functions of the light wave distance meter according to this embodiment will be described in detail with reference to the drawings.

FIG. 3 is a timing chart indicating a light-emitting signal and a light-receiving signal of the light wave distance meter according to this embodiment.

Figure 4:
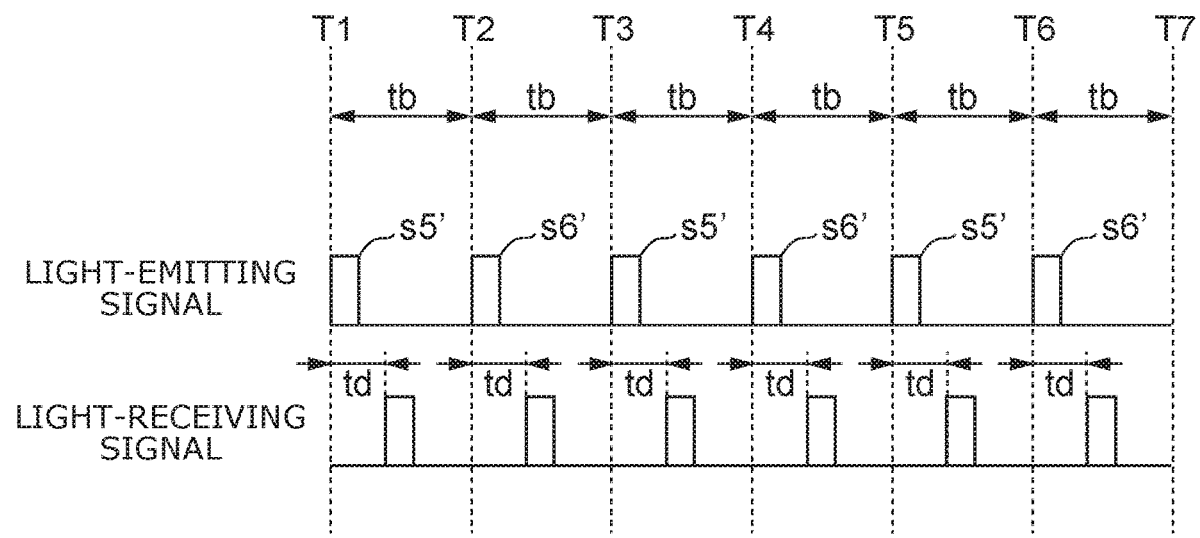
FIG. 4 is a timing chart indicating a light-emitting signal and a light-receiving signal of a light wave distance meter according to a comparative example.

FIG. 4 is a timing chart indicating a light-emitting signal and a light-receiving signal of a light wave distance meter according to a comparative example.

Figure 5:
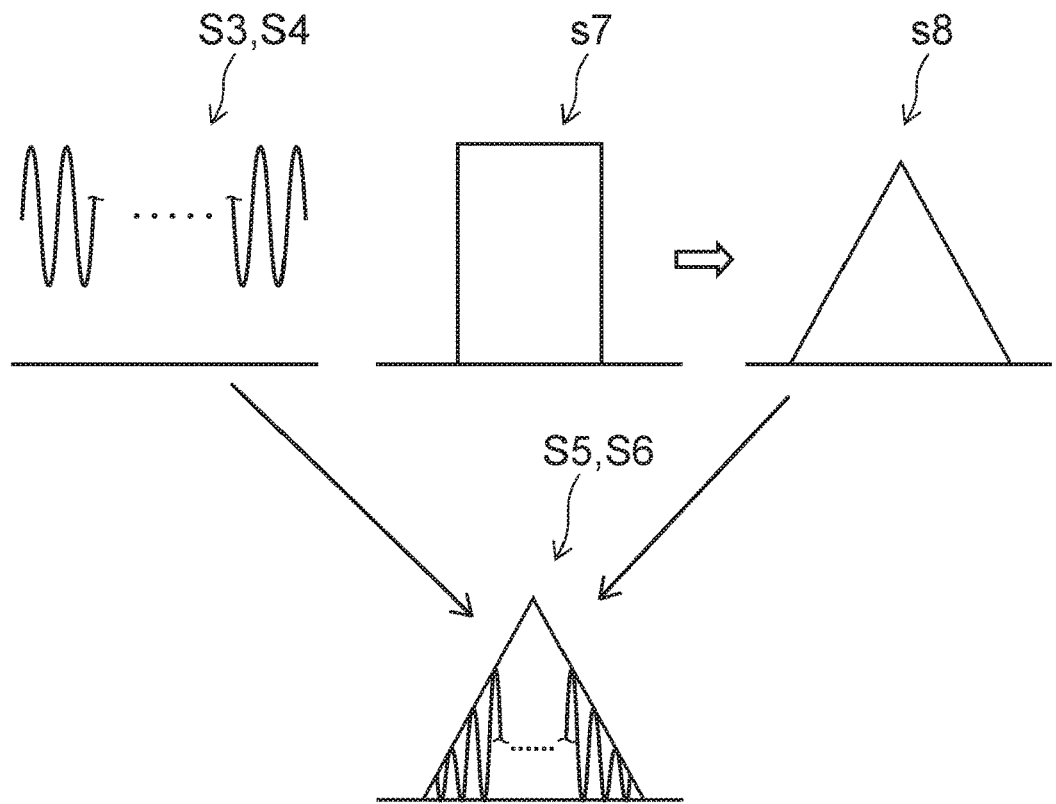
FIG. 5 is a schematic diagram depicting a pulse modulation signal of this embodiment.

FIG. 5 is a schematic diagram depicting a pulse modulation signal of this embodiment.

Figure 6:
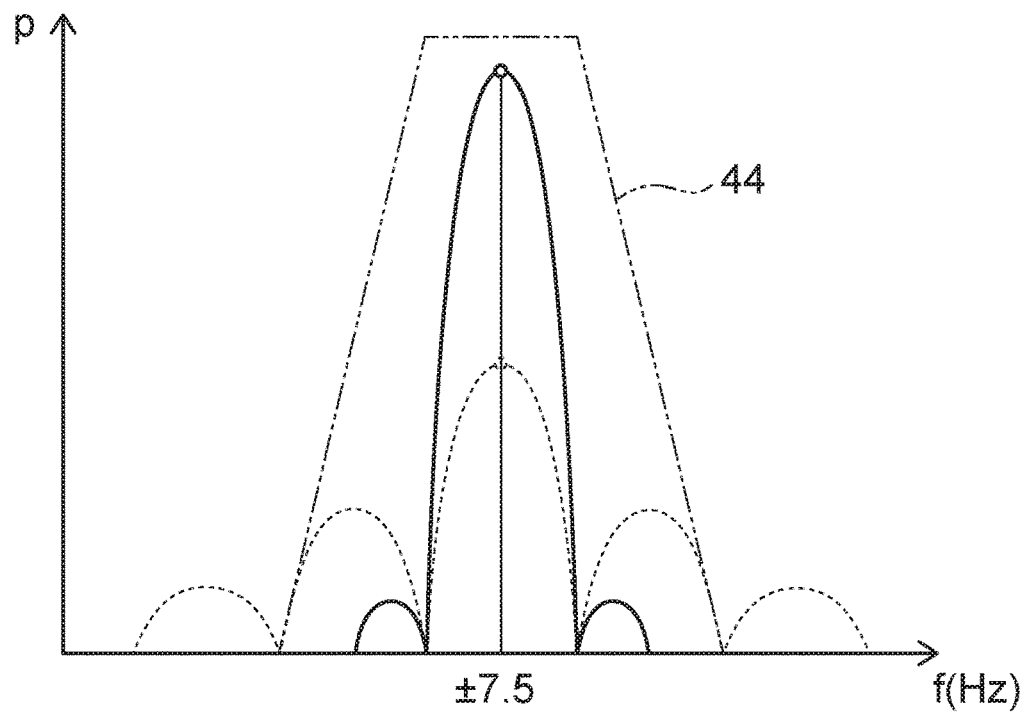
FIG. 6 is a graph when Fourier transform is performed on the light-receiving signal that is inputted to a low pass filter of this embodiment.

FIG. 6 is a graph when Fourier transform is performed on the light-receiving signal that is inputted to a low pass filter of this embodiment.

Figure 7:
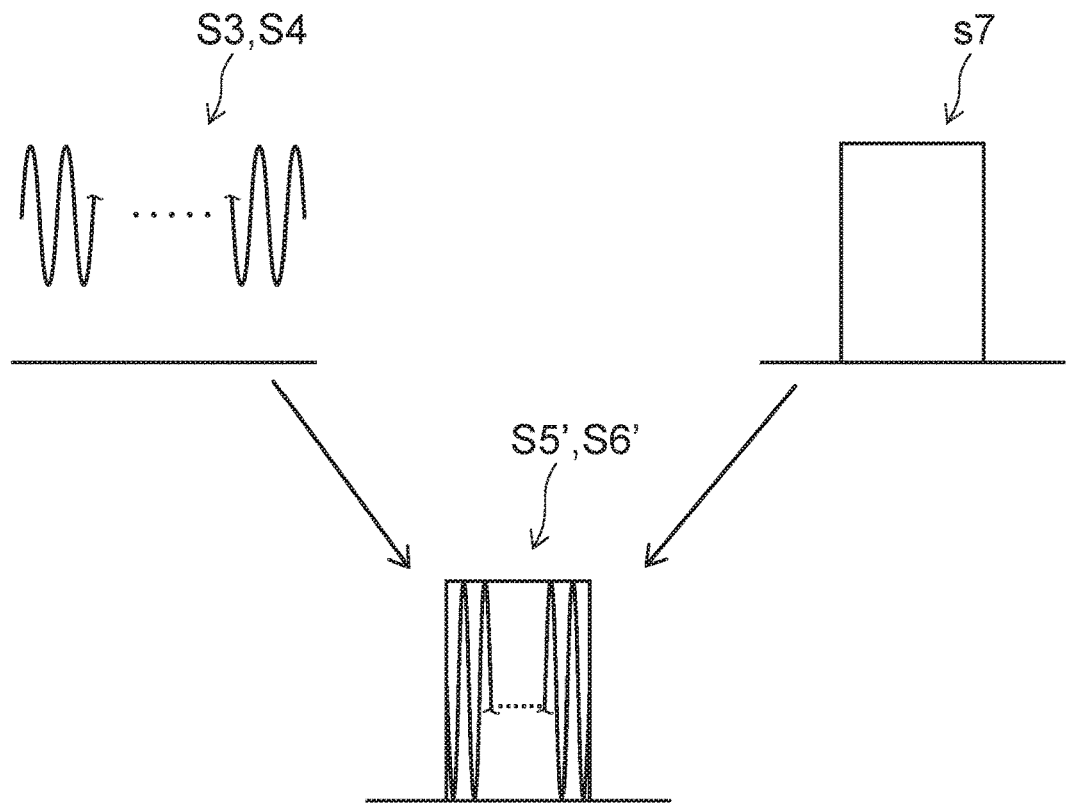
FIG. 7 is a schematic diagram depicting a pulse modulation signal of the comparative example.

FIG. 7 is a schematic diagram depicting a pulse modulation signal of the comparative example.

Figure 8:
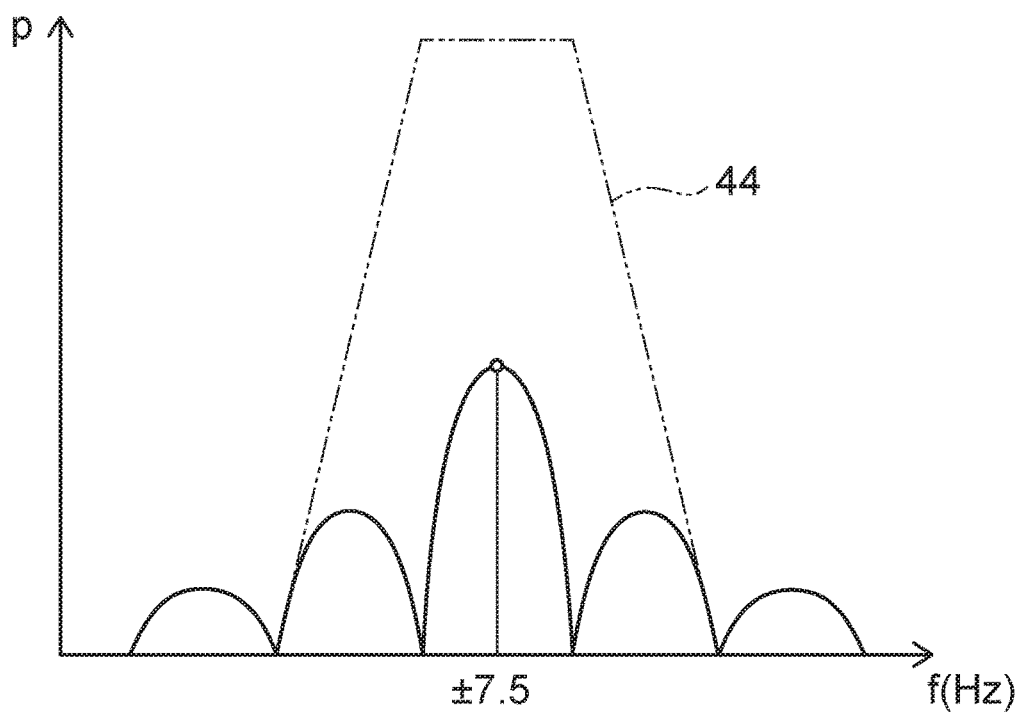
FIG. 8 is a graph when Fourier transform is performed on the light-receiving signal that is inputted to a low pass filter by the comparative example.

FIG. 8 is a graph when Fourier transform is performed on the light-receiving signal that is inputted to a low pass filter of the comparative example.

Each timing chart indicated on the upper level of FIG. 3 and FIG. 4 is a timing chart indicating the generation timing of the pulse signal (light-emitting signal) output from the driver 38. In other words, each timing chart indicated on the upper level of FIG. 3 and FIG. 4 is a timing chart indicating the light-emitting timing of the light-emitting element 11. Each timing chart indicated on the lower level of FIG. 3 and FIG. 4 is a timing chart indicating the generation timing of the light-receiving signal output from the light-receiving element 21. In FIG. 6, the graph when Fourier transform is performed on the light-receiving signal of the comparative example (indicated by a broken line) is superimposed on the graph when Fourier transform is performed on the light-receiving signal of this embodiment.

First the light wave distance meter of the comparative example will be described with reference to FIG. 4, FIG. 7, and FIG. 8. If a composing element of the light wave distance meter according to the comparative example is the same as the composing element of the light wave distance meter of this embodiment described with reference to FIG. 1 and FIG. 2, unnecessary redundant description is omitted, and primarily the differences will be described. In the arithmetic processing unit of the light wave distance meter of the comparative example, the waveform conversion unit 51 described with reference to FIG. 2 is not disposed. The other composing elements are the same as the composing elements of the arithmetic processing unit of the light wave distance meter of this embodiment described with reference to FIG. 2.

As indicated in FIG. 4, the light-emitting element 11 of the comparative example outputs a distance measurement light based on a first pulse modulation signal s5' and a distance measurement light based on a second pulse modulation signal s6' alternately, switching at intervals tb. The light-receiving element 21 of the comparative example, on the other hand, receives the pulse modulation light based on the first pulse modulation signal s5' having fc+f (120 MHz+ 7.5 MHz) and the pulse modulation light based on the second pulse modulation signal s6' having fc−f (120 MHz− 7.5 MHz) alternately as the reflected distance measurement light 28'. Therefore, the light-receiving signal of the light-receiving element 21 of the comparative example is output as pulses. The pulses of the light-receiving signal include the intermittent light-receiving signals 29 having the frequencies fc+f [Hz] and fc−f [Hz]. As indicated in FIG. 4, delay time td, which is in accordance with the distance between the light wave distance meter and the measurement object 5, is generated between the light-receiving signal and the light-emitting signal.

The first pulse modulation signal s5', the second pulse modulation signal s6' and the light-receiving signal of the light-receiving element 21 of the comparative example will be further described. As illustrated in FIG. 7, the first signal generator 33 generates and outputs the first modulation signal s3 modulated by fc+f [Hz]. The second signal generator 34 generates and outputs the second modulation signal s4 modulated by fc−f [Hz]. This is the same as the first modulation signal s3 and the second modulation signal s4 described above with reference to FIG. 2. The timing signal generator 39 generates the timing signal s7. As illustrated in FIG. 7, the timing signal s7 is a pulse signal of a rectangular wave. In other words, the waveform profile of the timing signal s7 is a waveform profile of a rectangular wave. Then the first intermittent pulse generator 35 generates the first pulse modulation signal s5' by pulsating the first modulation signal s3, output from the first signal generator 33, so as to have the waveform of a rectangular wave. The second intermittent pulse generator 36 generates the second pulse modulation signal s6' by pulsating the second modulation signal s4, output from the second signal generator 34, so as to have the waveform profile of a rectangular wave. Hence as illustrated in FIG. 7, the pulses of the first pulse modulation signal s5', which has a rectangular wave, includes the modulation signal having the frequency fc+f [Hz]. The pulses of the second pulse modulation signal s6', which has a rectangular wave, includes the modulation signal having the frequency fc−f [Hz].

In the light wave distance meter of the comparative example, the graph in FIG. 8 is acquired if Fourier transform is performed on the light-receiving signal which passes through the mixing circuit 43 and is inputted to the low pass filter 44. In other words, as illustrated in FIG. 8, in the case of the light wave distance meter of the comparative example, not only the difference frequency signal having ±7.5 MHz used for the measurement of the distance, but also the frequency signals having the bands that deviated from the difference frequency ±7.5 MHz are included in the light-receiving signals that are inputted to the low pass filter 44. The frequency signals having the bands that deviated from the difference frequency ±7.5 MHz are removed when passing through the low pass filter 44. In FIG. 8, the frequency bands that can pass the low pass filter 44 are expressed as the region inside the two-dot chain line. This is why, in the case of the light wave distance meter of the comparative example, a relatively large energy loss is generated when the light-receiving signal passes through the low pass filter 44. In otherwords, when the light-emitting element 11 emits light, energy is consumed even for the frequency components which are removed by the low pass filter 44 and are not used for the measurement of the distance.

On the other hand, the waveform conversion unit 51 is disposed in the arithmetic processing unit 27 of the light wave distance meter of this embodiment. In other words, as indicated in FIG. 3, the light-emitting element 11 of this embodiment outputs the distance measurement light based on the first pulse modulation signal s5 and the distance measurement light based on the second pulse modulation signal s6 alternately, switching at intervals tb. The light-receiving element 21 of this embodiment, on the other hand, receives the pulse modulation light (first reflected distance measurement light) based on the first pulse modulation signal s5 having fc+f (120 MHz+7.5 MHz), and the pulse modulation light (second reflected distance measurement light) based on the second pulse modulation signal s6 having fc−f (120 MHz−7.5 MHz) alternately as the reflected distance measurement light 28'. Therefore, the light-receiving signal of the light-receiving element 21 of this embodiment is output as pulses. The pulses of the light-receiving signal include the intermittent light-receiving signals 29 having the frequencies fc+f [Hz] and fc−f [Hz]. As indicated in FIG. 3, the delay time td, which is in accordance with the distance between the light wave distance meter and the measurement object 5, is generated between the light-receiving signal and the light-emitting signal.

As illustrated in FIG. 5, the first signal generator 33 generates and outputs the first modulation signal s3 modulated by fc+f [Hz]. The second signal generator 34 generates and outputs the second modulation signal s4 modulated by fc−f [Hz]. This is as described with reference to FIG. 2. The timing signal generator 39 generates the timing signal s7. As illustrated in FIG. 5, the timing signal s7 is a pulse signal of a rectangular wave. In other words, the waveform profile of the timing signal s7 has a waveform profile of a rectangular wave. Then the waveform conversion unit 51 converts the waveform profile of the rectangular wave of the timing signal s7 output from the timing signal generator 39, and generates the waveform conversion signal s8 constituted of desired frequency components used for the measurement of the distance.

As mentioned above concerning the light wave distance meter according to the comparative example, the frequency signals having bands that deviated from the difference frequency of ±7.5 MHz used for the measurement of the distance are removed when passing through the low pass filter 44. Therefore, the waveform profile of the light-receiving signal that passed through the low pass filter 44 becomes a waveform profile that is close to a profile of a rectangular wave of which one or both sides are removed. Hence as illustrated in FIG. 5, the waveform conversion unit 51 of this embodiment sets a waveform profile of a triangular wave as a waveform profile of a signal constituted of desired frequency components used for the measurement of the distance, and generates the waveform conversion signal s8 having the wave profile of a triangular wave. The waveform conversion unit 51 that generates the waveform conversion signal s8 having the waveform profile of a triangular wave is an operational amplifier or a DAC, for example.

Then as illustrated in FIG. 5, the first intermittent pulse generator 35 generates the first pulse modulation signal s5 by pulsating the first modulation signal s3 output from the first signal generator 33 so as to have the waveform profile of the triangular wave. In other words, based on the first modulation signal s3 output from the first signal generator 33, and the waveform conversion signal s8 generated by and output from the waveform conversion unit 51, the first intermittent pulse generator 35 generates the first pulse modulation signal s5 which includes a modulation signal, having frequency fc+f [Hz], inside the pulse of which envelope has a triangular contour. The second intermittent pulse generator 36 generates the second modulation signal s6 by pulsating the second modulation signal s4 output from the second signal generator 34 so as to have the waveform profile of the triangular wave. In other words, based on the second modulation signal s4 output from the second signal generator 34 and the waveform conversion signal s8 generated by and output from the waveform conversion unit 51, the second intermittent pulse generator 36 generates the second pulse modulation signal s6 which includes the modulation signal, having frequency fc-f [Hz], inside the pulse of which envelope has a triangular contour. This means that, as illustrated in FIG. 5, the modulation signal, having frequency fc+f [Hz], is included inside the pulse of the first pulse modulation signal s5 having the waveform profile of a triangular wave, and the modulation signal, having frequency fc−f [Hz], is included inside the pulse of the second pulse modulation signal s6 having the waveform profile of the triangular wave.

In the light wave distance meter of this embodiment, the graph in FIG. 6 is acquired if Fourier transform is performed on the light-receiving signal which passes through the mixing circuit 43 and is inputted to the low pass filter 44. In other words, as illustrated in FIG. 6, in the case of the light wave distance meter of this embodiment, the waveform profiles of the first pulse modulation signal s5 and the second pulse modulation signal s6 that are inputted to the driver 38 are the same as the waveform profile of the signal constituted of desired frequency components used for the measurement of the distance, hence the frequency signals in the bands that deviated from the difference frequency ±7.5 MHz used for the measurement of the distance are barely included in the light-receiving signals that are inputted to the low pass filter 44. Therefore, according to the light wave distance meter of this embodiment, the energy loss, which is generated when the light-receiving signal passes through the low pass filter 44, can be reduced. In other words, energy that is consumed for frequency components, which are removed by the low pass filter 44 and are not used for the measurement of the distance, can be minimized.

According to the light wave distance meter of this embodiment, the waveform profile of the pulse signal (first pulse modulation signal s5 and the second pulse modulation signal s6), which is inputted to the driver 38 during the distance measurement (when emitting light) matches with the waveform profile of the signal constituted of desired frequency components used for the measurement of the distance. Hence the frequency components removed by the low pass filter 44 can be minimized, and energy loss caused by the low pass filter 44 can be reduced. This means that the signal components in the signal-noise ratio (SN ratio) can be increased, which improves the SN ratio. In other words, in the light wave distance meter of this embodiment, the frequency components, which are removed by the low pass filter 44 and not used for measurement in the light wave distance meter of the comparative example, can be used for desired frequency components used for the measurement of the distance. As a result, as illustrated in FIG. 6, the intensity of the desired frequency components (difference frequency signals having ±7.5 MHz used for the measurement of the distance in the case of this embodiment) can be increased, while keeping the intensity of the distance measurement light 28 within the limit specified by the standards. In other words, the light-emitting efficiency of the light-emitting element 11 can be improved. Thereby the measurement accuracy, the measurable distance and the scan rate can be improved while keeping the intensity of the distance measurement light 28 within the limit specified by the standards.

According to the light wave distance meter of this embodiment, the distance measurement light modulated by fc+f (120 MHz+7.5 MHz) and the distance measurement light modulated by fc−f (120 MHz−7.5 MHz) are alternately emitted from the light-emitting element 11, switching at predetermined intervals tb. Then as the reflected distance measurement light 28', the pulse modulation light corresponding to the first pulse modulation signal s5 having fc+f (120 MHz+7.5 MHz), and the pulse modulation light corresponding to the second pulse modulation signal s6 having fc−f (120 MHz−7.5 MHz) are alternately received by the light-receiving element 21. The difference frequency signal having +7.5 MHz generated by frequency-converting the pulse modulation light corresponding to the first pulse modulation signal s5 and the difference frequency signal having −7.5 MHz generated by frequency-converting the pulse modulation light corresponding to the second pulse modulation signal s6 have a phase difference in accordance with the distance to the measurement object, hence the distance to the measurement object can be accurately determined based on the difference frequency signals having ±7.5 MHz. In other words, the measurement accuracy can be further improved.

Furthermore, according to the light wave distance meter of this embodiment, the waveform conversion unit 51 sets the waveform profile of the triangular wave as the waveform profile of the signal constituted of desired frequency components used for the measurement of the distance, and generates the waveform conversion signal s8 having the waveform profile of the triangular wave. Hence the light wave distance meter of this embodiment can match the waveform profile of the pulse signal (first pulse modulation signal s5 and the second pulse modulation signal s6), which is inputted to the driver 38 when emitting light, with the waveform of a signal constituted of desired frequency components used for the measurement of the distance, relatively easily using a simple configuration which includes the waveform conversion unit 51 (e.g. operational amplifier, DAC). Therefore, the frequency components removed by the low pass filter 44 can be minimized with certainty, and energy loss caused by the low pass filter 44 can be reduced with certainty, relatively easily using a simple configuration. As a result, the intensity of desired frequency components (difference frequency signal having ±7.5 MHz used for the measurement of the distance in the case of this embodiment) can be increased with higher certainty while keeping the intensity of the distance measurement light 28 within the limit specified by the standards, and the measurement accuracy, the measurable distance and the scan rate can be improved.

In this embodiment, the case of the waveform conversion unit 51 setting the waveform profile of the triangular wave as the waveform profile of the signal constituted of desired frequency components used for the measurement of the distance was described as an example. However, the waveform profile set by the waveform conversion unit 51 as the waveform profile of the signal constituted of desired frequency components used for the measurement of the distance is not limited to the waveform profile of the triangular wave. In the following, other examples of the waveform profiles which the waveform conversion unit 51 sets as the waveform profile of the signal constituted of desired frequency components used for the measurement of the distance will be described with reference to the drawings.

Figure 9:
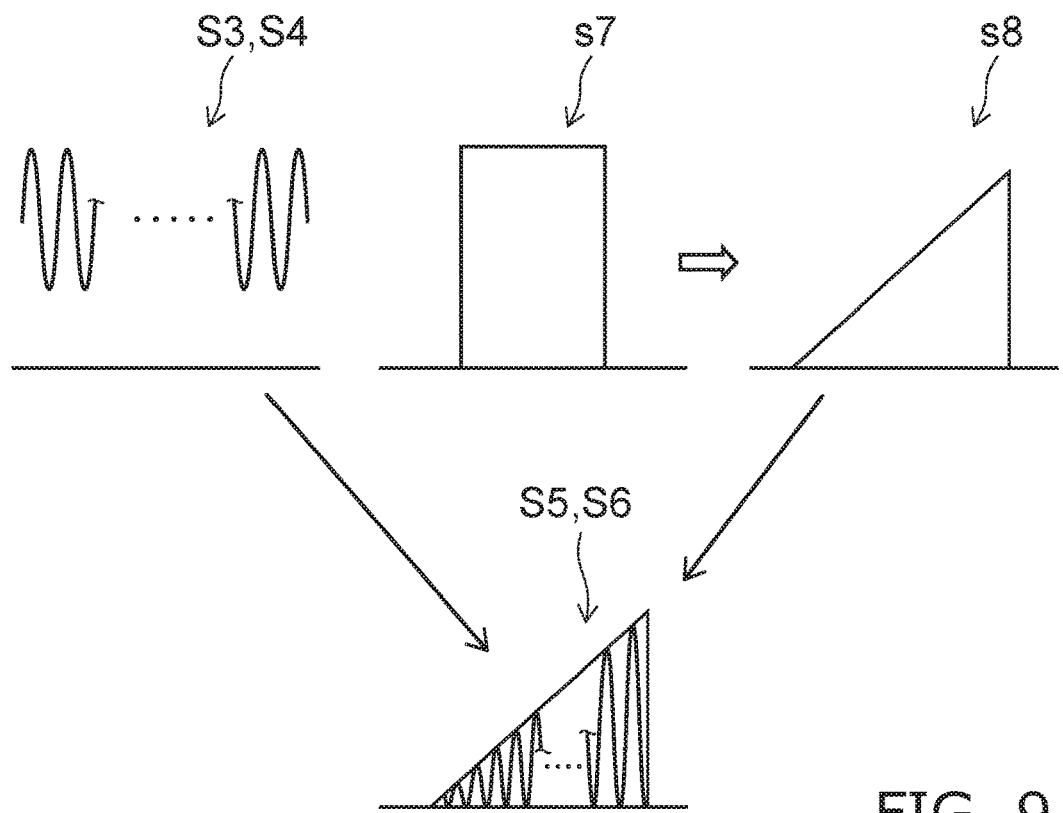
FIG. 9 is a schematic diagram depicting a first modification of the pulse modulation signal of this embodiment.

FIG. 9 is a schematic diagram depicting a first modification of the pulse modulation signal of this embodiment.

The first modulation signal s3, the second modulation signal s4 and the timing signal s7 are as described above, with reference to FIG. 2 to FIG. 8. In this modification, as illustrated in FIG. 9, the waveform conversion unit 51 sets the waveform profile of the sawtooth wave as the waveform profile of the signal constituted of desired frequency components used for the measurement of the distance, and generates the waveform conversion signal s8 having the waveform profile of the sawtooth wave. The waveform conversion unit 51, which generates the waveform conversion signal s8 having the waveform profile of the sawtooth wave, is an operational amplifier or DAC, for example.

Then as illustrated in FIG. 9, the first intermittent pulse generator 35 generates the first pulse modulation signal s5 by pulsating the first modulation signal s3 output from the first signal generator 33 so as to have the waveform profile of the sawtooth wave. In other words, based on the first modulation signal s3 output from the first signal generator 33 and the waveform conversion signal s8 output from the waveform conversion unit 51, the first intermittent pulse generator 35 generates the first pulse modulation signal s5 which includes a modulation signal, having frequency fc+f [Hz], inside the pulse of which envelope has the sawtooth-shaped contour. The second intermittent pulse generator 36 generates the second pulse modulation signal s6 by pulsating the second modulation signal s4 output from the second signal generator 34 so as to have the waveform profile of the sawtooth wave. In other words, based on the second modulation signal s4 output from the second signal generator 34 and the waveform conversion signal s8 output from the waveform conversion unit 51, the second intermittent pulse generator 36 generates the second pulse modulation signal s6 which includes the modulation signal, having frequency fc−f [Hz], inside the pulse of which envelope has the sawtooth-shaped contour. This means that, as illustrated in FIG. 9, the modulation signal, having frequency fc+f [Hz], is included inside the pulse of the first pulse modulation signal s5 having the waveform profile of the sawtooth wave, and the modulation signal, having frequency fc−f [Hz], is included inside the pulse of the second pulse modulation signal s6 having the waveform profile of the sawtooth wave.

In this modification, a graph the same as the graph in FIG. 6 is acquired if Fourier transform is performed on the light-receiving signal which passes through the mixing circuit 43 and is inputted to the low pass filter 44.

According to this modification, the waveform conversion unit 51 sets the waveform profile of the sawtooth wave as the waveform profile of the signal constituted of desired frequency components used for the measurement of the distance, and generates the waveform conversion signal s8 having the waveform profile of the sawtooth wave. Hence the light wave distance meter of this modification can match the waveform profile of the pulse signal (first pulse modulation signal s5 and the second pulse modulation signal s6), which is inputted to the driver 38 when emitting light, with the waveform of a signal constituted of desired frequency components used for the measurement of the distance, relatively easily using a simple configuration which includes the waveform conversion unit 51 (e.g. operational amplifier, DAC). Therefore, the frequency components removed by the low pass filter 44 can be minimized with certainty, and energy loss caused by the low pass filter 44 can be reduced with certainty, relatively easily using a simple configuration. As a result, the intensity of desired frequency components (difference frequency signals having ±7.5 MHz used for the measurement of the distance in the case of this modification) can be increased with even higher certainty while keeping the intensity of the distance measurement light 28 within the limit specified by the standards, and the measurement accuracy, the measurable distance and the scan rate can be improved.

Further, the waveform profile of the pulse signal (first pulse modulation signal s5 and the second pulse modulation signal s6), which is inputted to the driver 38 during distance measurement (when emitting light) matches with the waveform profile of the signal constituted of desired frequency components used for the measurement of the distance, therefore an effect the same as the effect described above with reference to FIG. 3, FIG. 5 and FIG. 6 is acquired.

Figure 10:
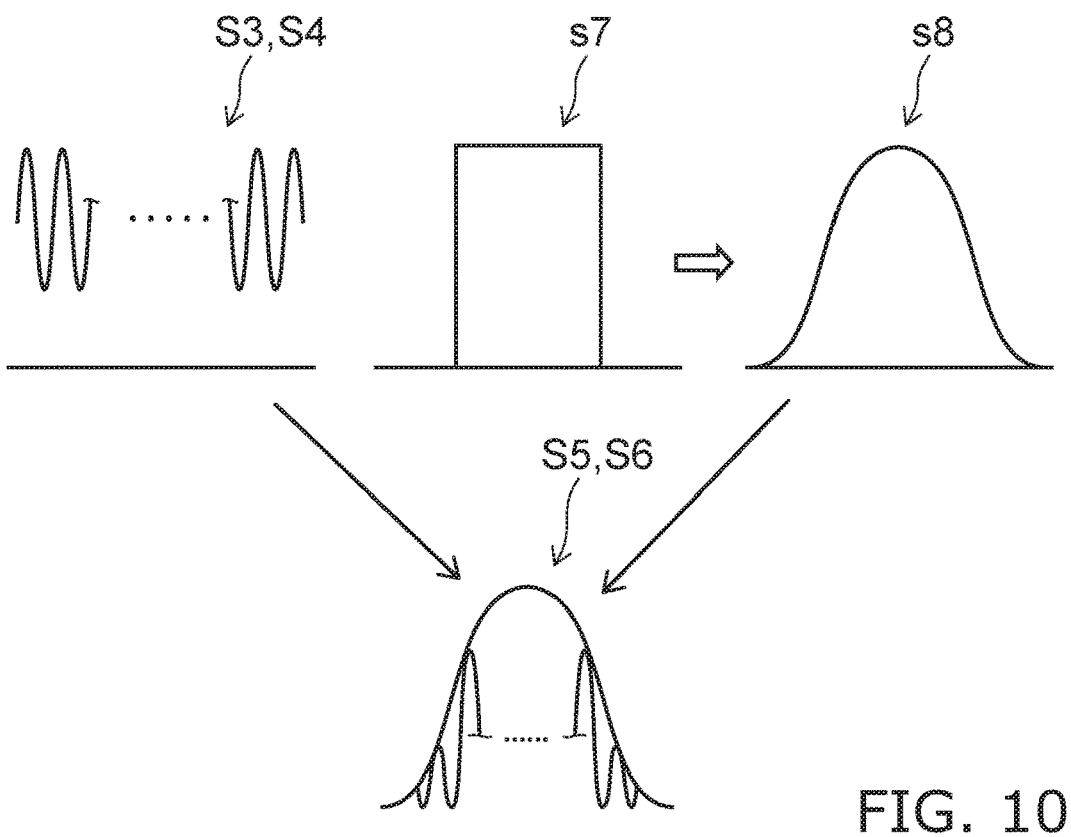
FIG. 10 is a schematic diagram depicting a second modification of the pulse modulation signal of this embodiment.

FIG. 10 is a schematic diagram depicting a second modification of the pulse modulation signal of this embodiment.

The first modulation signal s3, the second modulation signal s4 and the timing signal s7 are as described above, with reference to FIG. 2 to FIG. 8. In this modification, as illustrated in FIG. 10, the waveform conversion unit 51 sets the waveform profile expressed by a Gaussian function as the waveform profile of the signal constituted of the desired frequency components used for the measurement of the distance, and generates the waveform conversion signal s8 having the waveform profile expressed by the Gaussian function. The waveform conversion unit 51, which generates the waveform conversion signal s8 having the waveform profile expressed by the Gaussian function, is an analog filter or DAC, for example.

Then as illustrated in FIG. 10, the first intermittent pulse generator 35 generates the first pulse modulation signal s5 by pulsating the first modulation signal s3 output from the first signal generator 33 so as to have the waveform profile expressed by the Gaussian function. In other words, based on the first modulation signal s3 output from the first signal generator 33 and the waveform conversion signal s8 output from the waveform conversion unit 51, the first intermittent pulse generator 35 generates the first pulse modulation signal s5, which includes a modulation signal, having frequency fc+f [Hz], inside the pulse of which envelope is the Gaussian function. The second intermittent pulse generator 36 generates the second pulse modulation signal s6 by pulsating the second modulation signal s4 output from the second signal generator 34 so as to have the waveform profile expressed by the Gaussian function. In other words, based on the second modulation signal s4 output from the second signal generator 34 and the waveform conversion signal s8 generated by and output from the waveform conversion unit 51, the second intermittent pulse generator 36 generates the second pulse modulation signal s6 which includes the modulation signal, having frequency fc−f [Hz], inside the pulse of which envelope is the Gaussian function. This means that, as illustrated in FIG. 10, the modulation signal, having frequency fc+f [Hz], is included inside the pulse of the first pulse modulation signal s5 having the waveform profile expressed by the Gaussian function, and the modulation signal, having frequency fc−f [Hz], is included inside the pulse of the second pulse modulation signal s6 having the waveform profile expressed by the Gaussian function.

In this modification, a graph the same as the graph in FIG. 6 is acquired if Fourier transform is performed on the light-receiving signal which passes through the mixing circuit 43 and is inputted to the low pass filter 44.

According to this modification, the waveform conversion unit 51 sets the waveform profile expressed by the Gaussian function as the waveform profile of the signal constituted of desired frequency components used for the measurement of the distance, and generates the waveform conversion signal s8 having the waveform profile expressed by the Gaussian function. Hence the light wave distance meter of this modification can match the waveform profile of the pulse signal (first pulse modulation signal s5 and the second pulse modulation signal s6), which is inputted to the driver 38 when emitting light, with the waveform profile of a signal constituted of desired frequency components used for the measurement of the distance, even more accurately. Therefore, the frequency components removed by the low pass filter 44 can be minimized with even higher certainty, and energy loss caused by the low pass filter 44 can be reduced with even higher certainty. As a result, the intensity of the desired frequency components (difference frequency signals having ±7.5 MHz used for the measurement of the distance in the case of this modification) can be increased with even higher certainty while keeping the intensity of the distance measurement light 28 within the limit specified by the standards, and the measurement accuracy, the measurable distance and the scan rate can be improved.

Further, the waveform profile of the pulse signal (first pulse modulation signal s5 and the second pulse modulation signal s6), which is inputted to the driver 38 during distance measurement (when emitting light) matches with the waveform profile of the signal constituted of desired frequency components used for the measurement of the distance, therefore an effect the same as the effect described above with reference to FIG. 3, FIG. 5 and FIG. 6 is acquired.

An embodiment of the present invention has been described above. However, the present invention is not limited to this embodiment, but may be changed in various ways within the scope of the claims. The aspects of the configuration of this embodiment may be partially omitted, or may be combined to be different from the above description.

What is claimed is:

1. A light wave distance meter that irradiates a measurement object with a distance measurement light, and measures a distance to the measurement object based on a reflected distance measurement light that is the distance measurement light reflected by the measurement object, comprising:
   a light-emitting element that emits the distance measurement light;
   a light-receiving element that receives the reflected distance measurement light and outputs a light-receiving signal in accordance with the reflected distance measurement light;
   a frequency conversion unit that includes a bandpass filter that allows a specific frequency band to pass, out of the light-receiving signal output from the light-receiving element and includes a timing signal generator that generates a pulse signal of a rectangular wave;
   an arithmetic control unit that executes arithmetic processing to determine a distance value to the measurement object based on the signal output from the frequency conversion unit;
   a signal generator that generates a signal having a predetermined frequency;
   a waveform conversion unit that generates a waveform conversion signal by converting a waveform profile of the rectangular wave of the pulse signal output from the timing signal generator, the waveform conversion signal constituted of desired frequency components used for the measurement of the distance;
   a pulse generator that generates a pulse signal by pulsating the signal having the frequency output from the signal generator, so as to have a waveform profile of a signal constituted of desired frequency components used for the measurement of the distance, based on the signal having the frequency and the waveform conversion signal output from the waveform conversion unit; and
   a drive unit that drives the light-emitting element and causes the light-emitting element to emit the distance measurement light based on the pulse signal generated by the pulse generator.

2. The light wave distance meter according to claim 1, wherein
   the signal generator generates a first modulation signal modulated by a first frequency, and a second modulation signal modulated by a second frequency which is close to the first frequency,
   the pulse generator generates a first pulse modulation signal generated by pulsating the first modulation signal so as to have a waveform profile of a signal constituted of desired frequency components used for the measurement of the distance based on the first modulation signal output from the signal generator and the waveform conversion signal output from the waveform conversion unit, and a second pulse modulation signal generated by pulsating the second modulation signal so as to have a waveform profile of a signal constituted of desired frequency components used for the measurement of the distance based on the second modulation signal output from the signal generator and the waveform conversion signal output from the waveform conversion unit,
   the drive unit drives the light-emitting element based on the first pulse modulation signal and the second pulse modulation signal, and switches and emits a first distance measurement light modulated by the first frequency and a second distance measurement light modulated by the second frequency,
   the light-receiving element receives a first reflected distance measurement light corresponding to the first distance measurement light reflected by the measurement object, and a second reflected distance measurement light corresponding to the second distance measurement light reflected by the measurement object,
   the frequency conversion unit generates a first difference frequency signal by performing frequency conversion on the first reflected distance measurement light received by the light-receiving element, and generates a second difference frequency signal that has a phase difference in accordance with the distance to the measurement object with respect to the first difference frequency signal, by performing frequency conversion on the second reflected distance measurement light received by the light-receiving element, and
   the arithmetic control unit executes arithmetic processing to determine a distance value to the measurement object based on the first difference frequency signal and the second difference frequency signal.

3. The light wave distance meter according to claim 1, wherein the waveform profile of the waveform conversion signal is a waveform profile expressed by a parabolic function.

4. The light wave distance meter according to claim 2, wherein the waveform profile of the waveform conversion signal is a waveform profile expressed by a parabolic function.

5. The light wave distance meter according to claim 1, wherein the waveform profile of the waveform conversion signal is a waveform profile of a triangular wave.

6. The light wave distance meter according to claim 2, wherein the waveform profile of the waveform conversion signal is a waveform profile of a triangular wave.

7. The light wave distance meter according to claim 1, wherein the waveform profile of the waveform conversion signal is a waveform profile of a sawtooth wave.

8. The light wave distance meter according to claim 2, wherein the waveform profile of the waveform conversion signal is a waveform profile of a sawtooth wave.

9. The light wave distance meter according to claim 1, wherein the waveform profile of the waveform conversion signal is a waveform profile expressed by a Gaussian function.

10. The light wave distance meter according to claim 2, wherein the waveform profile of the waveform conversion signal is a waveform profile expressed by a Gaussian function.

* * * * *